(12) United States Patent
Martinelli et al.

(10) Patent No.: US 7,145,646 B2
(45) Date of Patent: Dec. 5, 2006

(54) ON-LINE TENSION MEASUREMENT IN AN OPTICAL FIBER

(75) Inventors: Paolo Martinelli, Milan (IT); Franco Trespidi, Piacenza (IT)

(73) Assignee: Pirelli & C. S.p.A., Milan (IT)

( * ) Notice: Subject to any disclaimer, the term of this patent is extended or adjusted under 35 U.S.C. 154(b) by 90 days.

(21) Appl. No.: 10/499,809

(22) PCT Filed: Dec. 27, 2001

(86) PCT No.: PCT/EP01/15331

§ 371 (c)(1),
(2), (4) Date: Mar. 3, 2005

(87) PCT Pub. No.: WO03/056288

PCT Pub. Date: Jul. 10, 2003

(65) Prior Publication Data

US 2005/0162640 A1    Jul. 28, 2005

(51) Int. Cl.
*G01N 21/00* (2006.01)
(52) U.S. Cl. ................................... 356/73.1
(58) Field of Classification Search ............ None
See application file for complete search history.

(56) References Cited

U.S. PATENT DOCUMENTS 4,866,266 A * 9/1989 Calvani et al. ........ 250/227.17

5,519,487 A * 5/1996 Atwood et al. ............ 356/73.1

FOREIGN PATENT DOCUMENTS

EP          0 151 015 A2     8/1985
JP          57-196737        12/1982

OTHER PUBLICATIONS

Jiro, S., "Measurement Method of Double refraction for Transparent Filament", Patent Abstracts of Japan of JP Publication No. 55-089730, (Jul. 7, 1980).
Chu, P. L. et al., "An On-Line Fiber Drawing Tension and Diameter Measurement Device", Journal of Lightwave Technology, vol. 7, No. 2, pp. 255-261, (Feb. 1989).

* cited by examiner

*Primary Examiner*—Tu T. Nguyen
(74) *Attorney, Agent, or Firm*—Finnegan, Henderson, Farabow, Garrett & Dunner, L.L.P.

(57) ABSTRACT

A process of contactless monitoring the tension in an optical fiber and a tension meter which enables contactliess measurement of the tension in a bare and in a coated optical fiber. By measuring the retardation induced by the birefringence of an optical fiber by means of a polarized light beam incident to the fiber at an angle between about 10° and 25° to the detection optical axis, it is possible to accurately measure tensions over a wide range, i.e., from less than about 10 g to about 450 g. The method enables monitoring the tension during the ramp-up of the drawing process and is particularly advantageous for the control of the drawing tension in manufacturing of NZD, multimode or special fibers. Accurate monitoring of the tension both on a bare and on a coated fiber can also be achieved.

17 Claims, 13 Drawing Sheets

ON-LINE TENSION MEASUREMENT IN AN OPTICAL FIBER

CROSS REFERENCE TO RELATED APPLICATION

This application is a national phase application based on PCT/EP01/15331, filed Dec. 27, 2001, the content of which is incorporated herein by reference.

BACKGROUND OF THE INVENTION

1. Field of the Invention

This invention relates to an apparatus and a method for monitoring tension in optical fibres, in particlar during the drawing of such fibres. More generally the invention relates to a method of manufacturing optical fibres.

2. Description of the Related Art

During the process of drawing optical fibres from a preform a number of parameters, which influence the quality of the final product, need to be controlled. The heating temperature of the preform and the drawing rate must be in balance so that the fibre can be continuously drawn under uniform conditions. This is normally accomplished by continuous on-line monitoring of the tension within the fibre. Furnace temperature may be adjusted to reduce or increase the drawing tension. Among the existing methods for on-line measurement of the fibre tension, those that do not involve a physical contact with the fibre are often preferred.

Japanese patent application No. 57-196737 describes a contactless-measuring system for detecting the tension of an optical fibre during drawing. A circularly polarised light beam passes through an optical fibre. The light that has passed through the fibre is subjected to birefringence due to the tension which is being imposed on the fibre. As acknowledged in the application, the described system enabled to detect tensions from 5 to 200 g in optical fibres of 125 μM diameter and that measurements were possible at drawing speed up to 9 m/s.

P. L. Chu, T. Whitbread and P. M. Allen in "*An on-line fiber drawing tension and diameter measurement device*", Journal of Lightwave Technologies, vol. 7 pg. 255 (1989) describes a non-contact tension meter to monitor on line the drawing tension. In the disclosed tension meter polarised light illuminates the fibre laterally. The built-in thermal stress and the applied drawing tension transforms the fiber into an anisotropic structure so that the polarised light after traversing through the fibre cross-section suffers a retardation. The direction of polarisation is set at 45° to the fibre axis so that the components of the light polarised parallel and perpendicular to the fibre axis are equal. FIG. 1 illustrates the ray trajectory through the fibre cross-section. When the ray emerges from the fibre, there is a phase shift between the two components, which is called retardation R. The retardation is a function of the ray incident position y and is given by:

$$R(y) = 2C \int_y^b \frac{\sigma_z(r)r\,dr}{\sqrt{r^2 - y^2}} \quad (1)$$

where C is the stress-opto coefficient of the fiber and the variables y, r, b are shown in FIG. 1. The axial stress $\sigma_z(r)$ has two components, the applied drawing tension T and the built-in thermal stress $\sigma_{z0}(r)$:

$$\sigma_z(r) = T/\pi b^2 + \sigma_{z0}(r). \quad (2)$$

The contribution due to the built-in thermal stress is considered to be small compared to the contribution due to the applied tension.

The axial stress can be derived from Eq. (1) by solving the integral equation:

$$\sigma_z(r) = \frac{-1}{\pi C} \int_r^b \frac{dR(y)/dy}{\sqrt{y^2 - r^2}}\,dy \quad (3)$$

Thus, if the retardation function R(y) of the fibre is known, the axial stress profile can be reconstructed through Eq. (3).

The light scattered from the fibre is collected by two photodetectors after passing a quarter-wave plate and polarisers. There are two polarisers at the detection side: one is set at +45° and the other polariser is set at −45° to the principal axis. The detected voltages resulting from the two polarisers are subtracted giving an output proportional to the fibre drawing tension. If the input ray is fixed to y values between $y_1$ and $y_2$, the power on the detector is given by:

$$P_0 = \int_{y_1}^{y_2} I\cos^2(R(y)/2 - \beta)dy, \quad (4)$$

where I is the intensity of the optical beam and β is the angle from the quarter-wave plate axis. Using two detectors, detectors 1 and 2, with β set to −45° and +45° for detector 1 and 2 respectively, the subtraction of the powers on the two detectors:

$$P_2 - P_1 = \int_{y_1}^{y_2} |[\cos^2(R(y)/2 + 45°)] - [\cos^2(R(y)/2 - 45°)]|dy \quad (5)$$

$$= \left|\int_{y_1}^{y_2} \sin(R(y))\right|$$

For small R(y), $P_2 - P_1$ can be assumed to be linear with R(y):

$$P_2 - P_1 = I\int_{y_1}^{y_2} R(y)dy \quad (6)$$

Inventors have observed that by taking the difference of the two signals, measurements may be influenced by light intensity fluctuations.

The ever increasing drawing speeds in optical fibre manufacturing require an accurate and continuous monitoring of the tension, especially if the process involves an essentially constant speed during drawing. Nowadays, manufacturing of dispersion-shifted or non-zero dispersion (NZD) fibres are often carried out at drawing speeds exceeding 10 m/s and pulling tensions of 200 g or more. Special fibres, such as Raman fibres, dispersion-compensating fibres or high numerical aperture fibres, can be drawn at even larger tension, e.g., 300–400 g.

SUMMARY OF THE INVENTION

The invention relates to a process of contactless monitoring the tension in an optical fibre and to a tension meter which enables contactless measurement of the tension in a bare and in a coated optical fibre. A particularly important application of the invention is in the area of control systems for drawing optical fibres.

Applicants have found that by measuring the retardation induced by the birefringence of an optical fibre by means of a polarised light beam incident onto the fibre at an angle between about 10° and 25° to the detection optical axis it is possible to accurately measure tensions over a wide range, i.e., from less than about 10 g to about 450 g included.

Measurements of small tensions, i.e., smaller than about 70 g, enables monitoring the tension during the ramp-up of the drawing process. The capability of measuring tensions larger than 200 g is particularly advantageous for the control of the drawing tension in manufacturing of NZD or special fibres. Furthermore, the method of the present invention allows to achieve an accurate monitoring of the tension both on a bare and on a coated fibre.

When the angle between the incident direction and the detection optical axis, herein referred to as the incident angle, is comprised between about 10° and 25°, the response of the tension meter of the present invention is highly linear. In this context, with linear response of the meter it is meant that: there exists a one-to-one correspondence between the observable quantity and the tension applied to the fibre; and that the observable quantity is substantially independent of the incident angle within a range of a few degrees. The angle independence (or very small dependence) within a range of a few degrees makes the meter less sensitive to small offsets due to transversal vibrations or lateral displacements of the optical fibre and to small misalignments of the meter collecting optics with respect to the illumination optics.

Preferably, the light incident angle is comprised between about 15° and 20°.

In one aspect, the invention relates to a method of measuring the tension in an optical fibre by measuring the change in the polarisation state of a light beam scattered from the optical fibre, wherein said optical fibre has a longitudinal fibre axis, said method comprising the steps of:

providing a light beam having a polarisation component along the fibre axis and a polarisation component orthogonal to the fibre axis;

directing the light beam onto the optical fibre so that the light beam enters the fibre transversally to the fibre axis and along an incident direction;

detecting the polarisation component along to the fibre axis and the polarisation component orthogonal to the fibre axis of a beam scattered from the optical fibre along a detection optical axis, wherein the detection optical axis forms an angle comprised between 10° and 25° to the incident direction.

In another aspect, the invention relates to a tension meter for contactless measuring the tension in an optical fibre having a longitudinal optical axis, said meter comprising:

a polarised light emission optical unit producing a substantially linearly polarised light beam having a polarisation angle of approximately 45° to the fibre axis, said light beam being directed onto the optical fibre along an incident axis;

a quarter-wave plate disposed with respect to the fibre along a detection optical axis so that the light beam scattered from the fibre passes through the quarter-wave plate;

a polarisation separator arranged along the detection optical axis after the quarter-wave plate for spatially separating the scattered light beam into two orthogonal polarised components;

first and second photodetectors, each of which for receiving one of the two orthogonal polarised components of the scattered light beam, wherein the detection optical axis forms an angle comprised between 10° and 25° to the incident direction.

DETAILED DESCRIPTION

Figure 1:
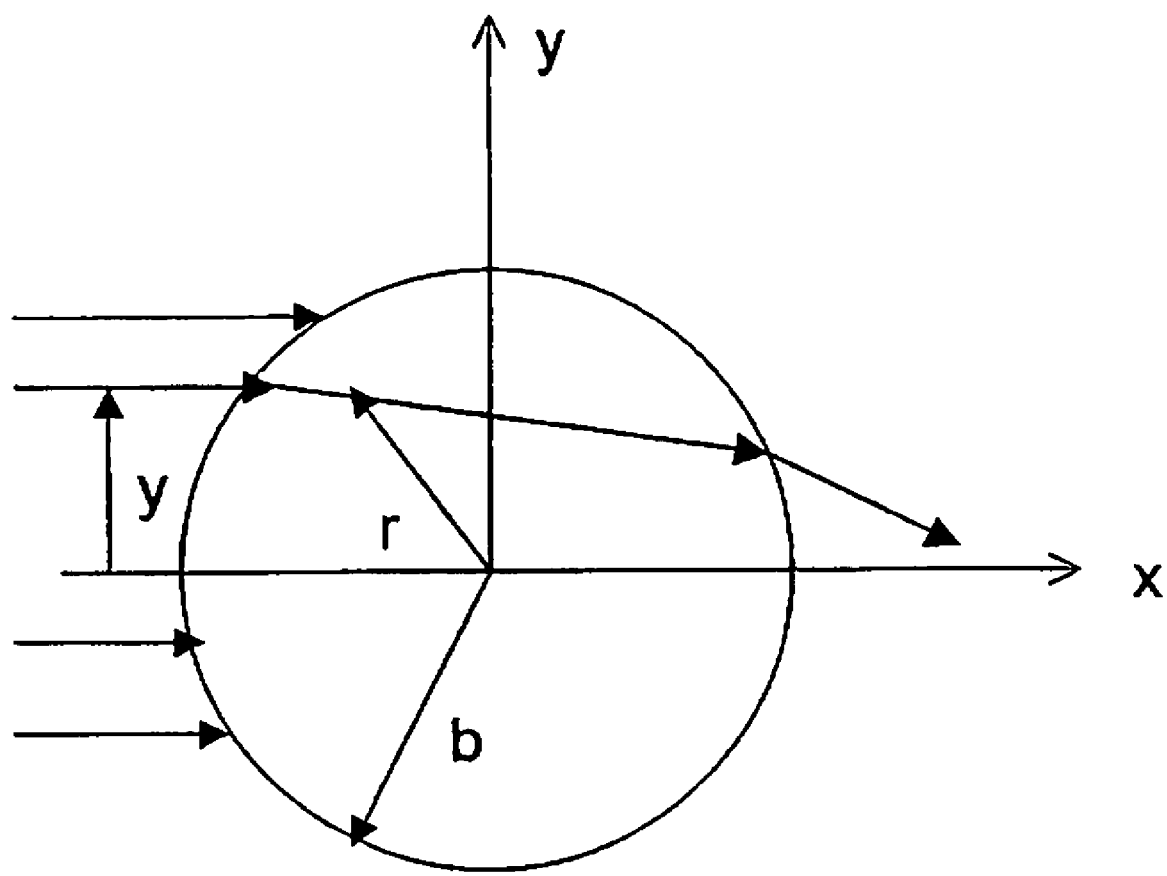
FIG. 1 is a schematic diagram illustrating the path of incident rays through an optical fibre.
Figure 2:
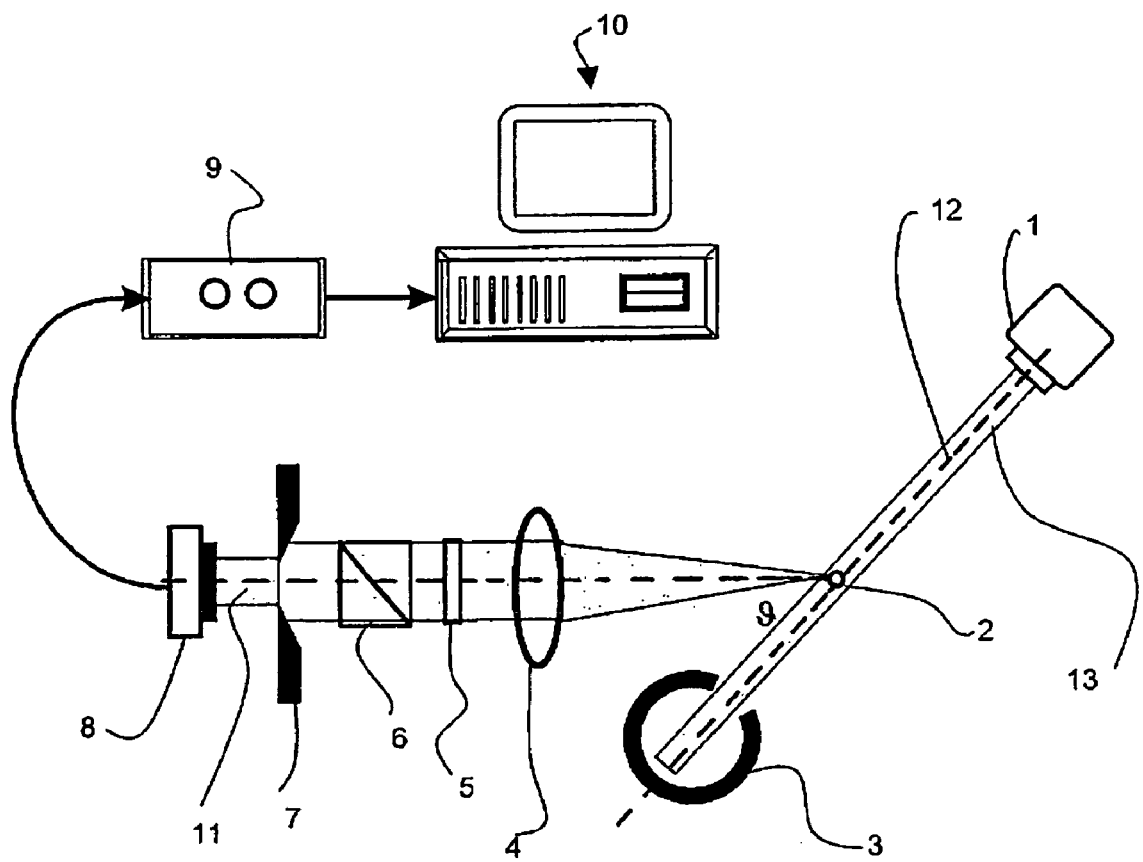
FIG. 2 is a schematic view of the tension measuring device constructed according to an embodiment of the present invention.

FIG. 2 shows a schematic diagram of the tension meter according to an embodiment of the present invention. A linearly-polarised light beam 13 impinges transversely on an optical fibre 2, i.e., the incident direction 12 is contained in a plane substantially perpendicular to the longitudinal fibre optical axis ("the fibre axis") or drawing direction (fibre cross-section is shown). The polarisation axis of the emitted light beam makes an angle of 45° to the fibre axis. Preferably, the light beam, diameter exceeds the fibre diameter. For example, the light beam diameter is of about 1 mm. For example, a collimated light beam is emitted from an edge-emitting laser diode at a wavelength of 680 nm and optical power of 5 mW. Part of the light scattered from the fibre passes through an imaging lens 4, a quarter-wave plate 5, a polarisation separator 6 and is finally collected by two photodetectors PD1 and PD2 indicated in FIG. 1 with enclosure 8. The polarisation separator 6 includes preferably a Wollaston prism. The light beam impinges on the fibre at an angle θ to the detection optical axis 11. In other words, θ denotes the angle between the incidence direction 12 of the probing optical beam and the detection optical axis 11. Preferably, the detection optical axis lies on the incident plane that is substantially perpendicular to the fibre axis and containing the incident direction. In principle, the detection optical axis may also slightly deviate from the incident plane, as the collection optics, such as the Wollaston prism and the quarter-wave plate have few degrees of allowable deviations from ideal co-planarity. However, larger deviations lead to a degradation in the experimental accuracy. To the purpose of studying the dependence of the scattered light on the incident angle θ, the laser was mounted on a platform (not shown) that could rotate of 135° around the fibre axis. A slit 7 was interposed between the Wollaston prism and the detectors in order to limit the imaged zone. For example, the slit collection angle is of 2°. The output currents of the photodetectors were converted into voltage signals and amplified by means of transimpedance amplifiers 9. The two voltage signals were acquired and processed by a processing unit 10, such as a computer.

Figure 3:
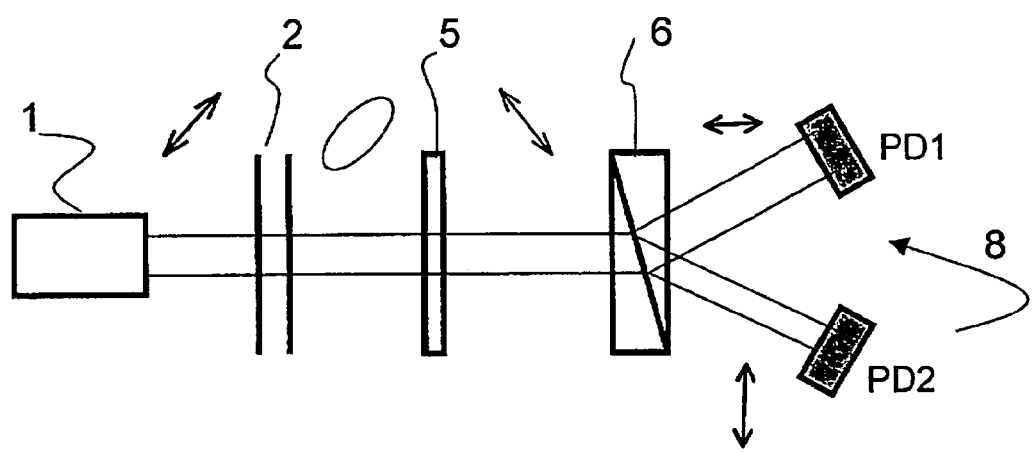
FIG. 3 is a schematic view, from a different perspective, of part of the tension measuring device shown in FIG. 2.

FIG. 3 illustrates part of the device of FIG. 2, in a view parallel to the fibre axis. The direction of the polarisation of the incident light beam is set at 45° to the fibre axis so that the orthogonal polarisation components are equal. Because of the applied drawing tension and less importantly of the built-in thermal stress the fibre behaved as a birefringent element by introducing a retardation between the two orthogonal polarisation components. In the most general case, the retardation resulted in an elliptically polarised scattered beam. The scattered beam passed through the quarter-wave plate, having its slow and fast axes both at 45° relative to the fibre axis, which converted the elliptical polarisation back into a linear polarisation that was rotated of an angle φ to the original 45° polarisation.

The Wollaston prism separates in angle (e.g., 20°) the two orthogonal polarisation components, allowing their separate detection by means of the two photodetectors PD1 and PD2. As an alternative of the Wollaston prism, the polarisation separator may comprise two polarisers to separately analyse the two components of the polarisation. In this case a beam splitter is placed before the two polarisers in order to split the scattered beam into two spatially separated beams. Spatial separation might be unnecessary in case detection is performed by a polarisation-sensitive photodetector.

After appropriate signal amplification, background subtraction and computer acquisition, the ratio of the intensity of the two orthogonal components of the polarisation is calculated. By taking the ratio of the two components, the ouput becomes independent of possible fluctuations of the light source. In practice, the ratio between the voltage output signals from the two photodetectors, which is the observable quantity, hereafter denoted as the polarisation ratio, $P_R$, is calculated. In particular, voltage output signals relative to the two polarisation components are acquired for a time t, for example t=5 s, averaged over that time and the ratio of the two averaged signals is calculated. When the fibre is running, e.g., during drawing, averages can also be taken on a certain length of the fibre, for instance on 10–30 m of the drawing fibre. The arctangent of the square root of this ratio is proportional to the retardation induced by the birefringence. The tension applied to the fibre is finally derived by using a calibration curve, which had been obtained by applying different known static loads to a fiber and by measuring the corresponding phase rotation from the original 45°.

The theory behind the experiments can be described as following. An electric field of amplitude $E_0$ propagating along the z-axis and having a polarisation angle α to the x-axis impinges an optical fibre whose optical axis lies along the y-axis. The incident electric field in the (x,y) plane can be expressed by (we consider the temporal dependence on time t)

$$E_{0x} = E_0 \cos \alpha e^{-i\omega t}$$

$$E_{0y} = E_0 \sin \alpha e^{-i\omega t} \quad (7)$$

The birefringence of the fibre introduces a phase shift φ/2 in the polarisation angle in one of the two field components. The electric field of the light beam emerging from the fibre is given by:

$$E_{1x} = E_{0x}(t) e^{-i\phi}$$

$$E_{1y} = E_{0y}(t) \quad (8)$$

The scattered beam passes through a quarter-wave plate having its fast axis at an angle β to the x-axis. The quarter-wave plate introduces a delay of π/2 between the two orthogonal components of the electric field. If α=β=π/4, the electric field can be expressed by $$E_{2X} = \frac{E_0}{2} \cos\left(\frac{\pi}{4} - \frac{\varphi}{2}\right) e^{-i\omega t},$$

$$E_{2Y} = \frac{E_0}{2} \sin\left(\frac{\pi}{4} - \frac{\varphi}{2}\right) e^{-i\omega t} \quad (9)$$

which represents a polarised electric field with polarisation aids rotated of φ/2 with respect to the original polarisation incident onto the fiber (at π/4=45°).

The polarisation ratio $P_R$ is given by the ratio between the field intensities relative to the x- and y-axis:

$$P_R = \frac{E_{2Y}^2}{E_{2X}^2} = tg^2\left(\frac{\pi}{4} - \frac{\varphi}{2}\right). \quad (10)$$

Equation (10) can be rewritten in the form $$\varphi = 2\left[\frac{\pi}{4} - \arctg\left(\sqrt{P_R}\right)\right], \quad (11)$$

which is the equation that relates the retardation φ induced by the birefringence in the fibre and the ratio of the field intensities for the two polarization components.

EXAMPLE 1

Figure 4:
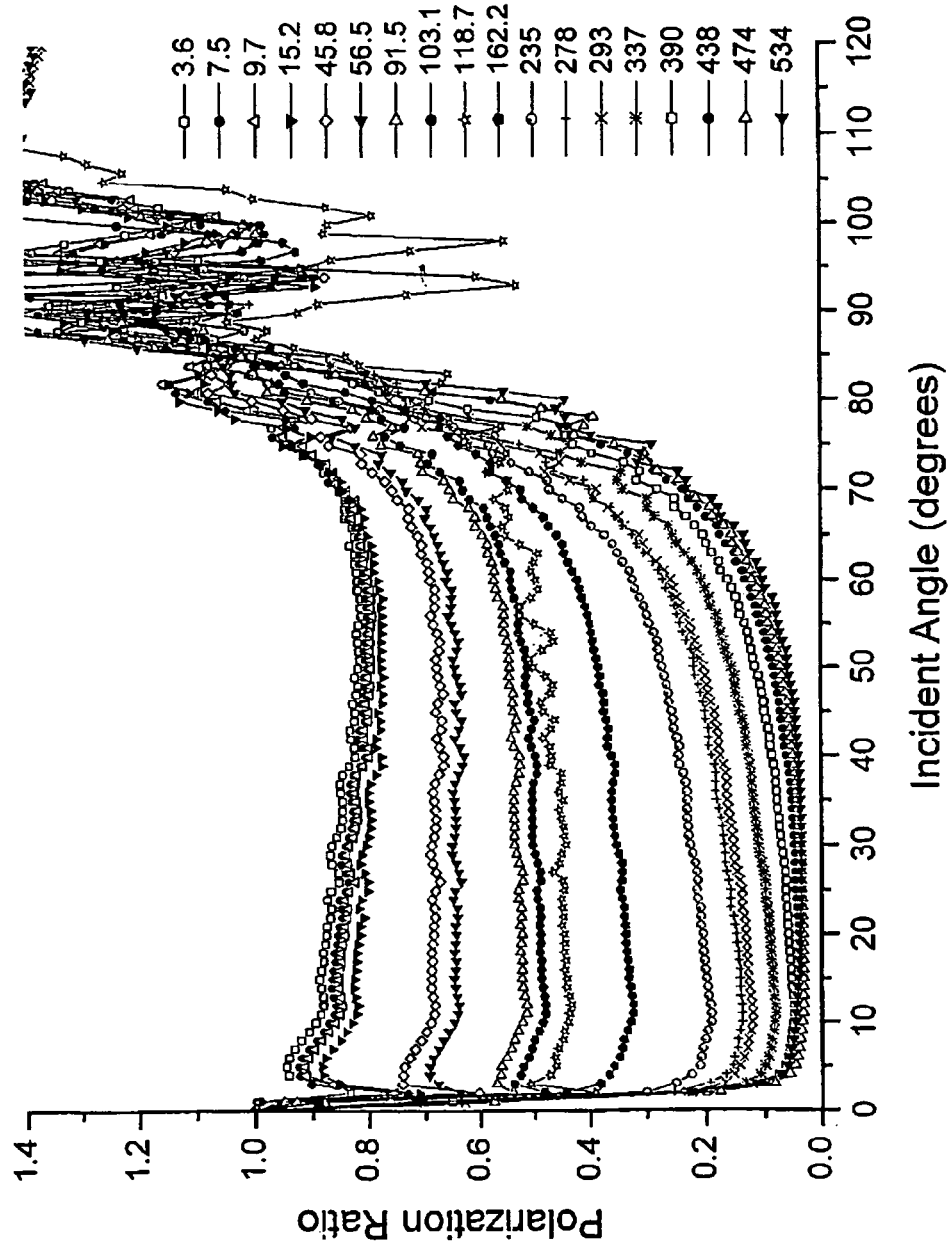
FIG. 4 is a graph illustrating the polarisation ratio between the horizontal and the vertical polarisation components of the scattered beam as a function of the incident angle for a bare SM fibre, which was measured at different applied tensions ranging from 3.6 to 534 g.

FIG. 4 displays the ratio of the two output signals, referred to as the polarisation ratio, as a function of the incident angle θ between the direction of the incident beam and the detection optical axis for a standard single-mode (SM) optical fibre without coating (i.e., bare fibre). The SM fibre had a core diameter of 8.8 μm and cladding diameter of 124.8 μm. Curves are reported for different values of applied tension, ranging from 3.6 to 534 g. At incident angles close to zero, i.e., the detection occurring along the incident light beam path, the polarisation ratio is highly non linear because of the superposition of the scattered beam with the incident beam and because of diffraction by the fibre border. At incident angles comprised between about 10° and 25° the response of the meter is highly linear for tensions from 3.6 to 474 g included. Any curve in this angle range is substantially flat and does not overlap with other curves that correspond to different tensions. For angles θ larger than about 25°, some curves exhibit fluctuations, i.e., are influenced by small changes of the incident angle. This behaviour becomes more evident at angles larger than about 40°, where some curves cross or touch each other. Crossing or overlapping of two (or more) curves implies that the one-to-one relationship between a value of polarisation ratio and the corresponding tension is lost. At angles larger than 60–70° the response becomes highly non linear: all curves cross each other and relatively large peak singularities, mainly due to interference phenomena and multiple internal reflections, are observed. Results thus indicate that when illumination occurs at an incident angle comprised between about 10° and 25° to the detection optical axis, the meter is able to measure a wide range of tensions with the highest accuracy. Preferably, the incident angle is comprised between about 15° and 20°.

Referring always to FIG. 4, the curves corresponding to the largest applied tension, i.e., 534 g., partially overlap each other in the 10–25° angle range, implying that the meter is relatively insensitive to tension variations within that tension range. Results, thus, give an approximate indication of the minimum and the maximum tension that can be accurately measured by the meter. The tension meter is therefore able to accurately measure tensions ranging from about 3.6 g to about 474 g.

EXAMPLE 2

Figure 5:
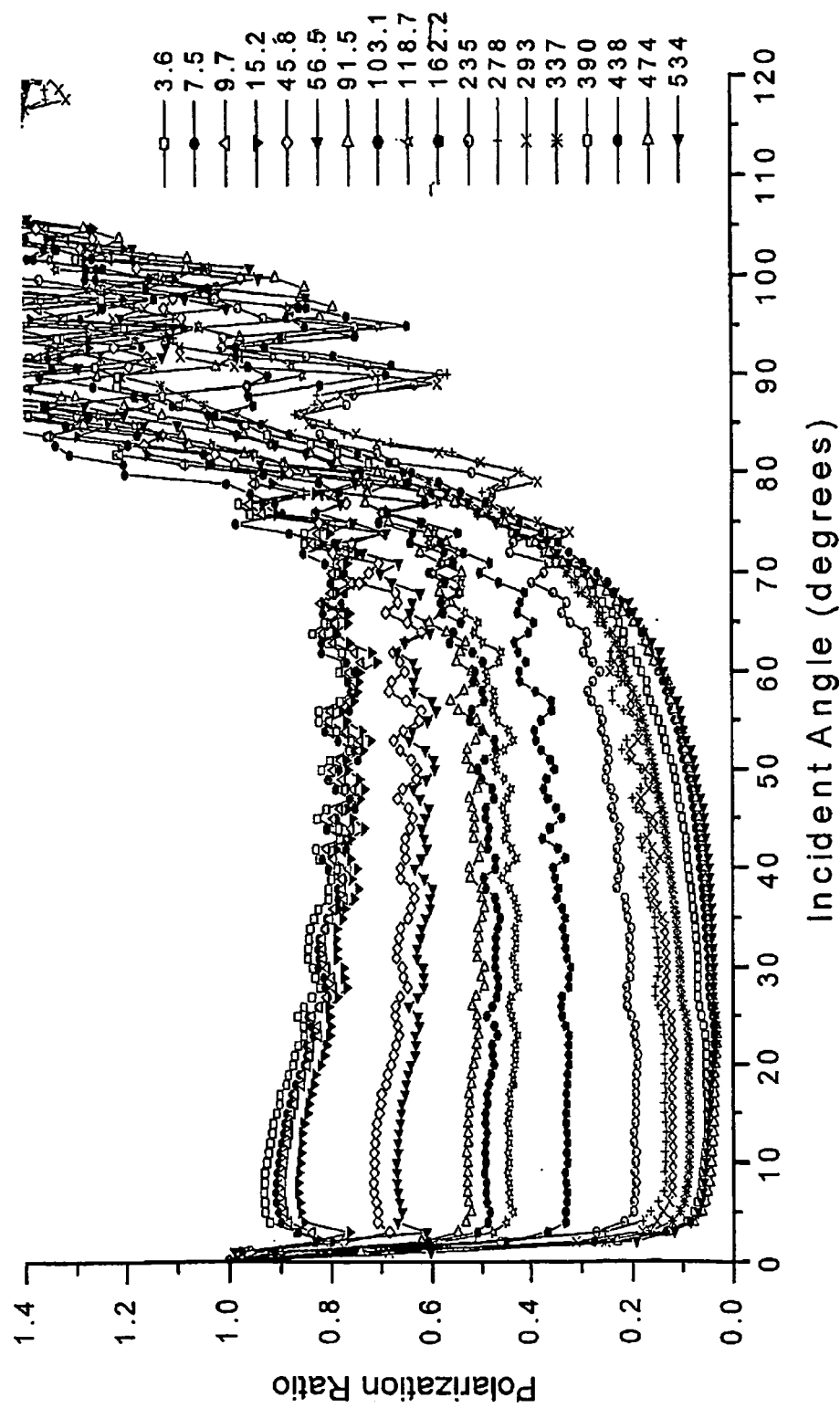
FIG. 5 is a graph illustrating the polarisation ratio vs. the incident angle for a bare MM fibre, which was measured at different applied tensions ranging from 3.6 to 534 g.

The polarisation ratio vs. the incident angle is reported in FIG. 5 for a bare multimode (MM) fibre produced by Pirelli having a graded-index core of diameter of 48.4 µm and a cladding diameter of 124.8 µm. Curves are measured for different tensions ranging from 3.6 to 534 g. Again, polarisation ratios exhibit the most linear behaviour for incident angles comprised between about 10° to 25° for tensions ranging from 3.6 g to 438 g included.

EXAMPLE 3

Figure 6:
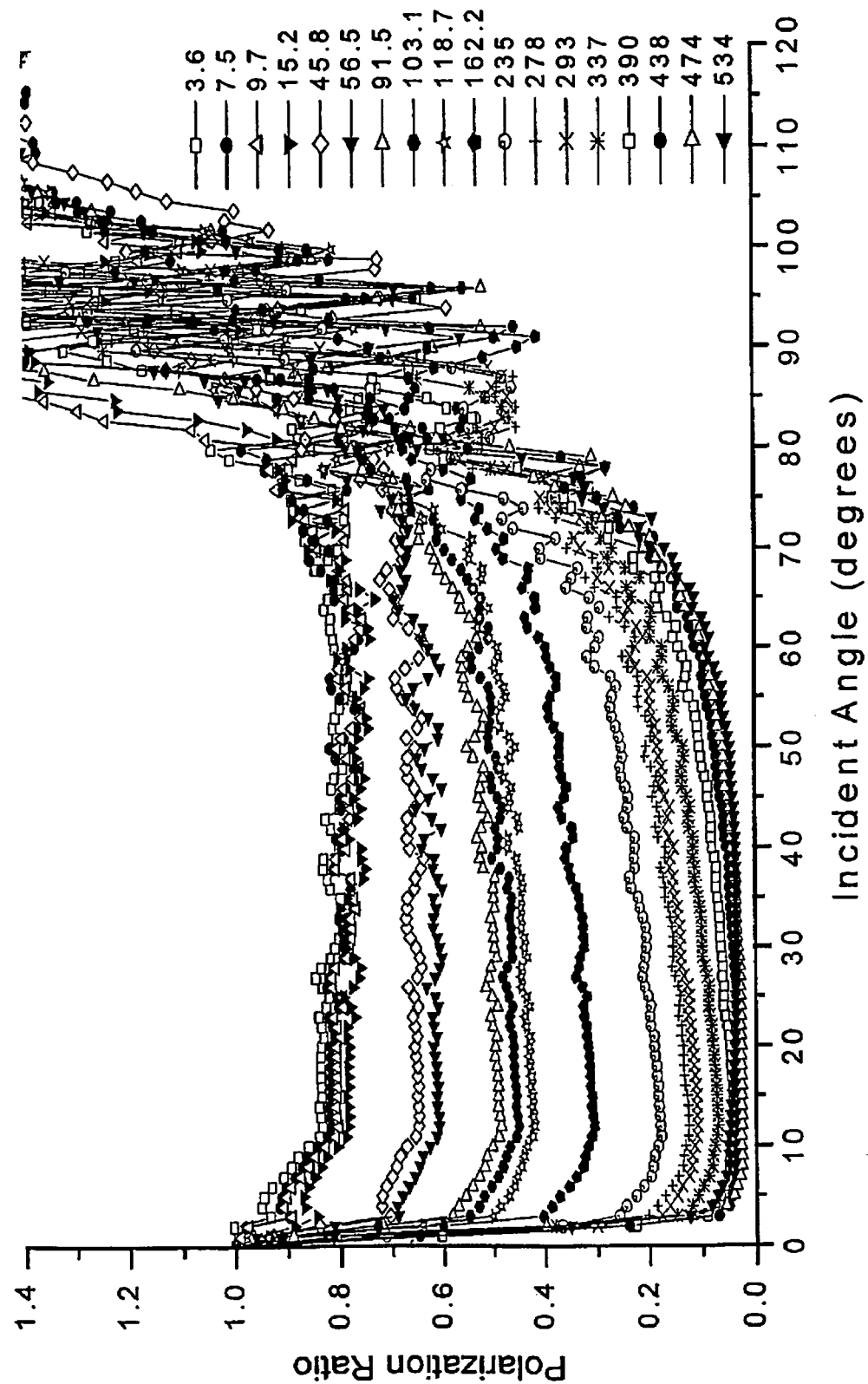
FIG. 6 is a graph illustrating the polarisation ratio vs. the incident angle for a bare NZD fibre, which was measured at different applied tensions ranging from 3.6 to 534 g.

A similar angular behaviour of the polarisation ratio is shown in FIG. 6 for a non-zero dispersion (NZD) fibre produced by Lucent with the commercial name Truewave® XL. The NZD fibre has a cladding diameter of about 125 µm.

Results shown in FIGS. 4 to 6 indicate that at certain incident angles, which are comprised between about 10° and 25°, and for applied tensions of less than about 10 g to more than about 450 g, the response of the meter is linear and is similar for very different types of fibres. Preferably, incident angles are comprised between 15° and 20°. Applicants have observed that for tensions from about 3–4 g up to about 450 g the polarisation ratio is a monotonic function of the applied tension. In the tension meter of the invention, errors in the detected tension, due to a transversal fibre movement of ±2 mm, were determined to be within ±2%. Errors due to ellipticity are negligible, as fibres with ellipticity of more than 1% are usually discarded.

Figure 7:
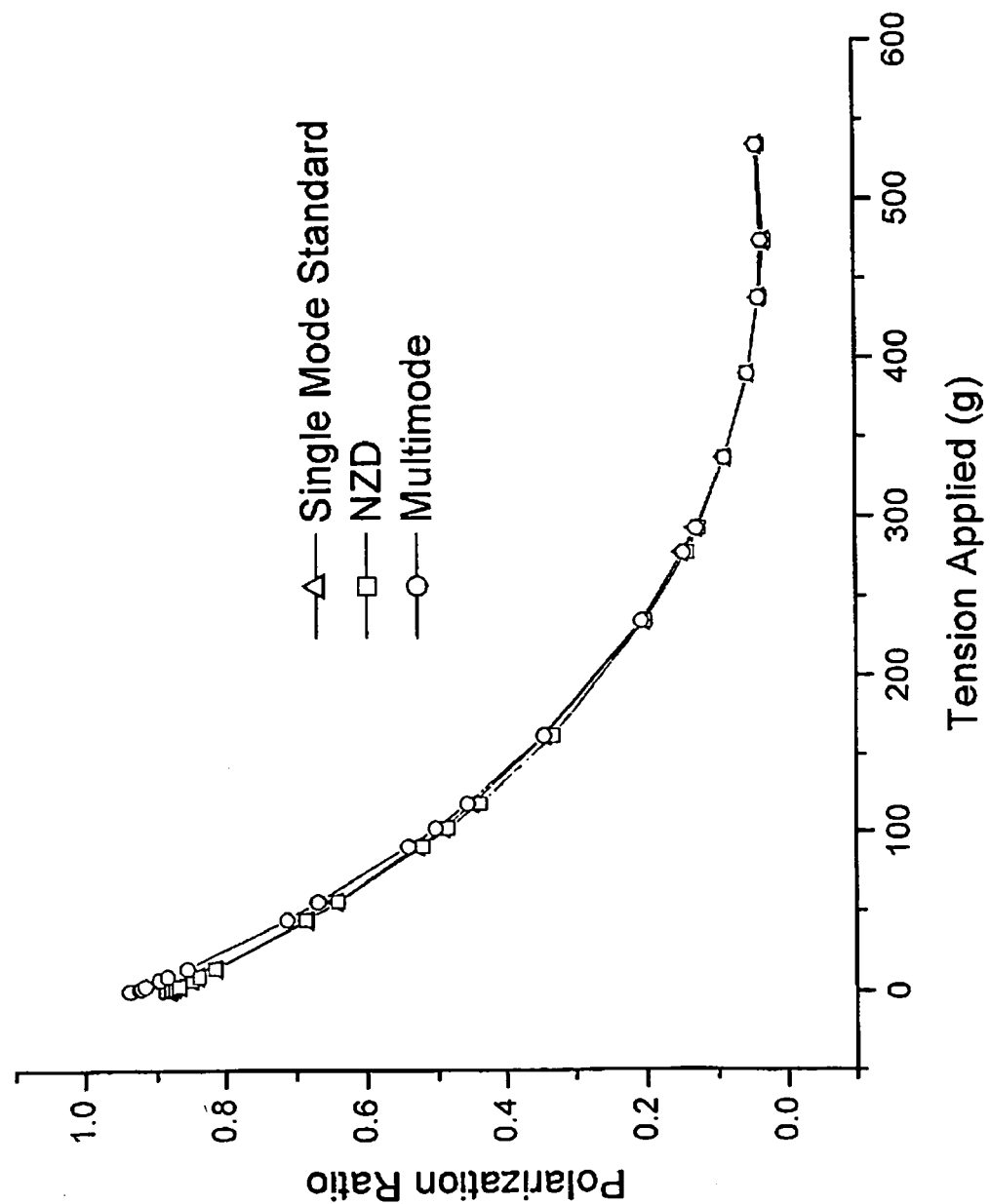
FIG. 7 is a graph illustrating the polarisation ratio as a function of the applied tension with the incident light beam set at θ=20° for the SM fibre, MM fibre and the NZD fibre described in examples 1 to 3.

FIG. 7 displays the polarisation ratio as a function of the applied tension with the incident light beam set at θ=20° for the SM fibre, MM fibre and the NZD fibre described in the previous examples. A very similar behaviour of the three curves is clearly observed for the three types of fibres. The meter of the present invention has thus the advantage that a single calibration curve can be used to measure tensions in different types of fibres.

EXAMPLE 4

Figure 8:
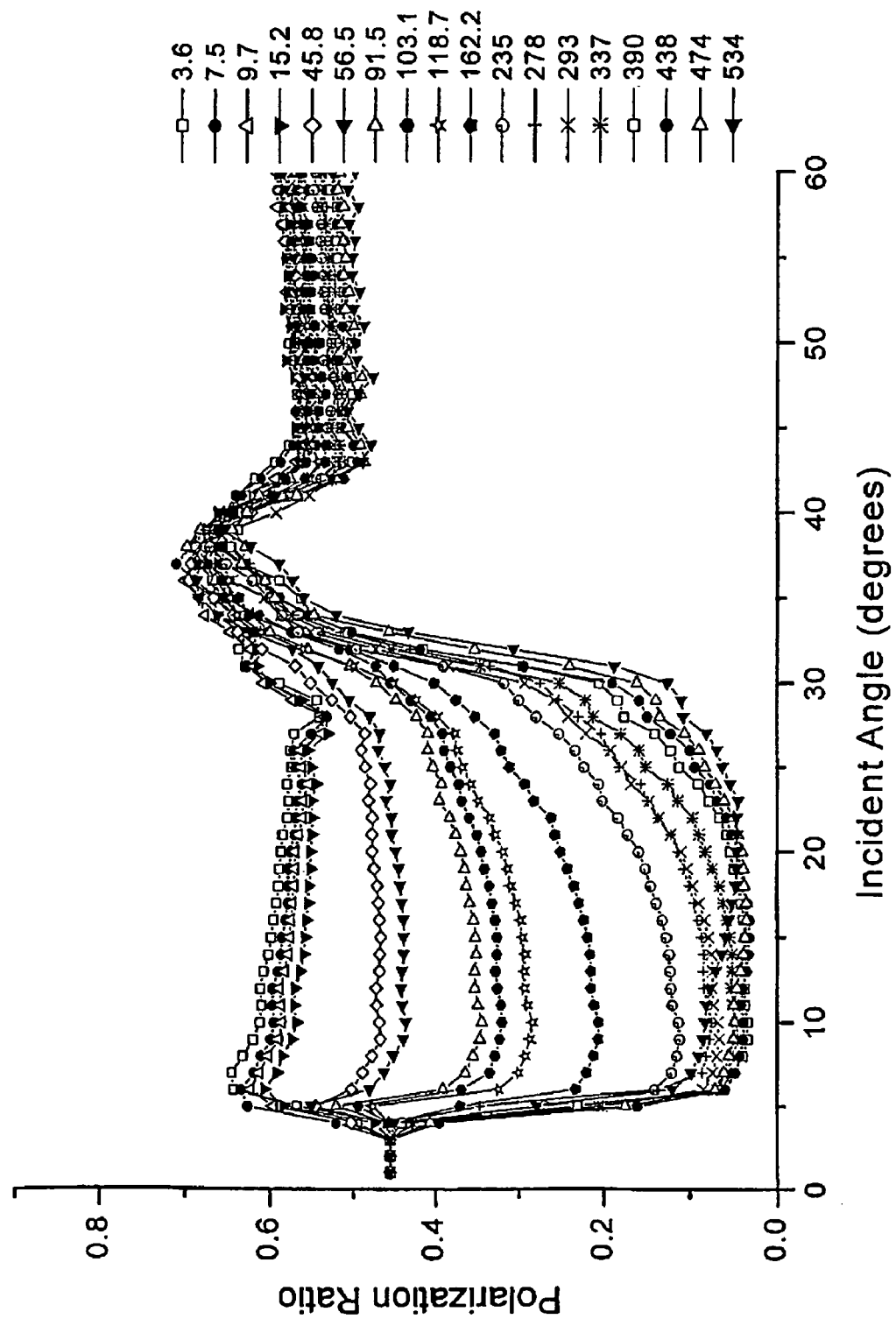
FIG. 8 is a graph illustrating the polarisation ration vs. incident angle for a standard SM fibre coated with CPC6®.

FIG. 8 reports the ratio of the two output signals as a function of the incident angle θ for the standard SM fibre of example 1 coated with CPC6® (natural coloured) produced by Corning Incorporated. Curves were measured for different values of applied tension ranging from 3.6 to 534 g. For incident angles larger than about 30°, the polarisation ratios are highly non linear. For applied tensions between 3.6 g to 235 g included, polarisation ratios are substantially flat and univocal at incident angles between about 10 and 25°, preferably between about 15 and 20°.

EXAMPLE 5

Figure 9:
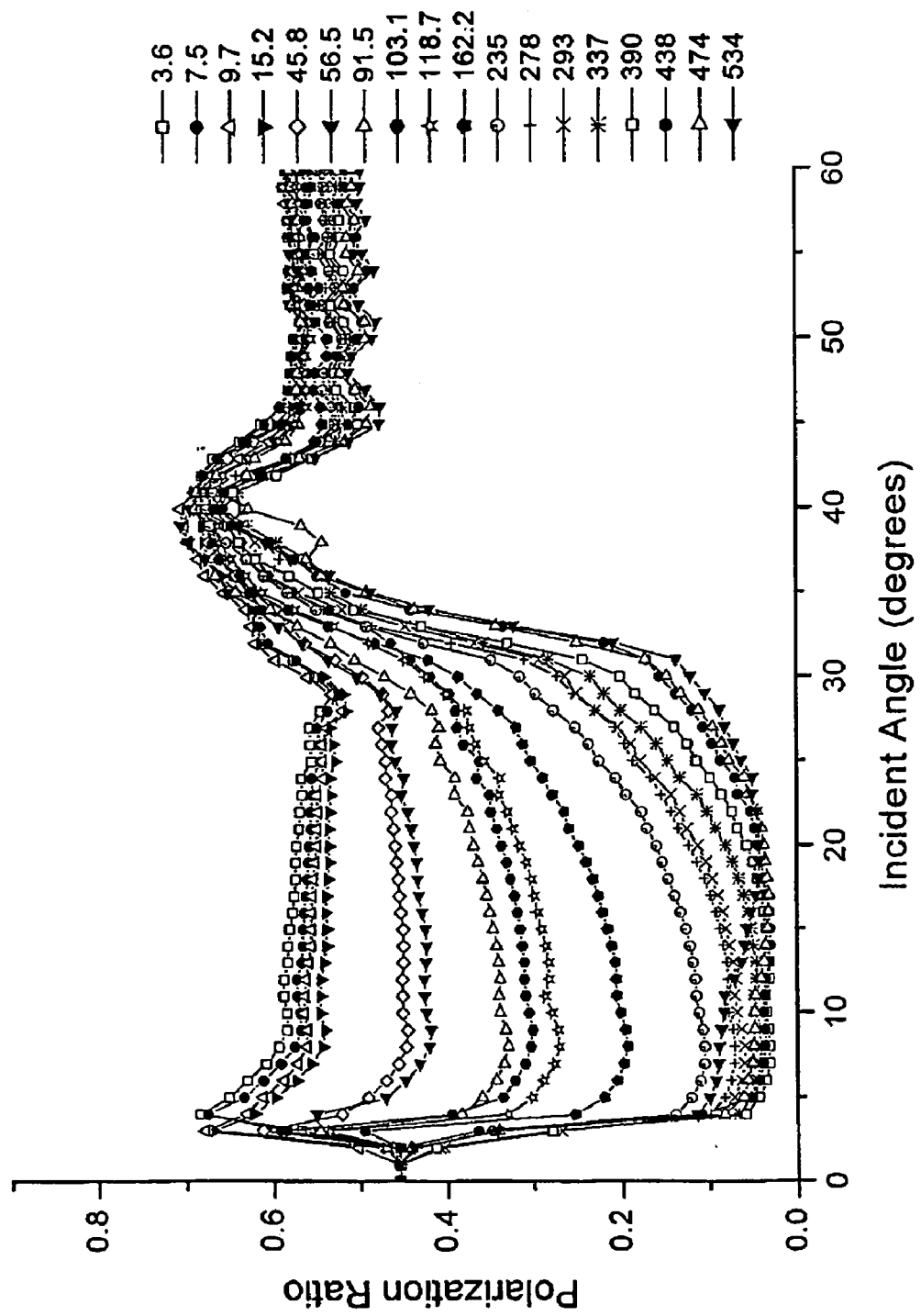
FIG. 9 is a graph illustrating the polarisation ration vs. incident angle for a NZD fibre coated with D-LUX®.

FIG. 9 displays the polarisation ratios vs. the incident angle for the NZD fibre of example 3 coated with D-LUX® (natural coloured) produced by Lucent Technologies. The external diameter of the coated fibres is of about 240–245 µm. Results show that linear response can be obtained for an incident angle comprised in the range about 10° to 25°, preferably in the range about 15° to 20°.

EXAMPLE 6

Figure 10:
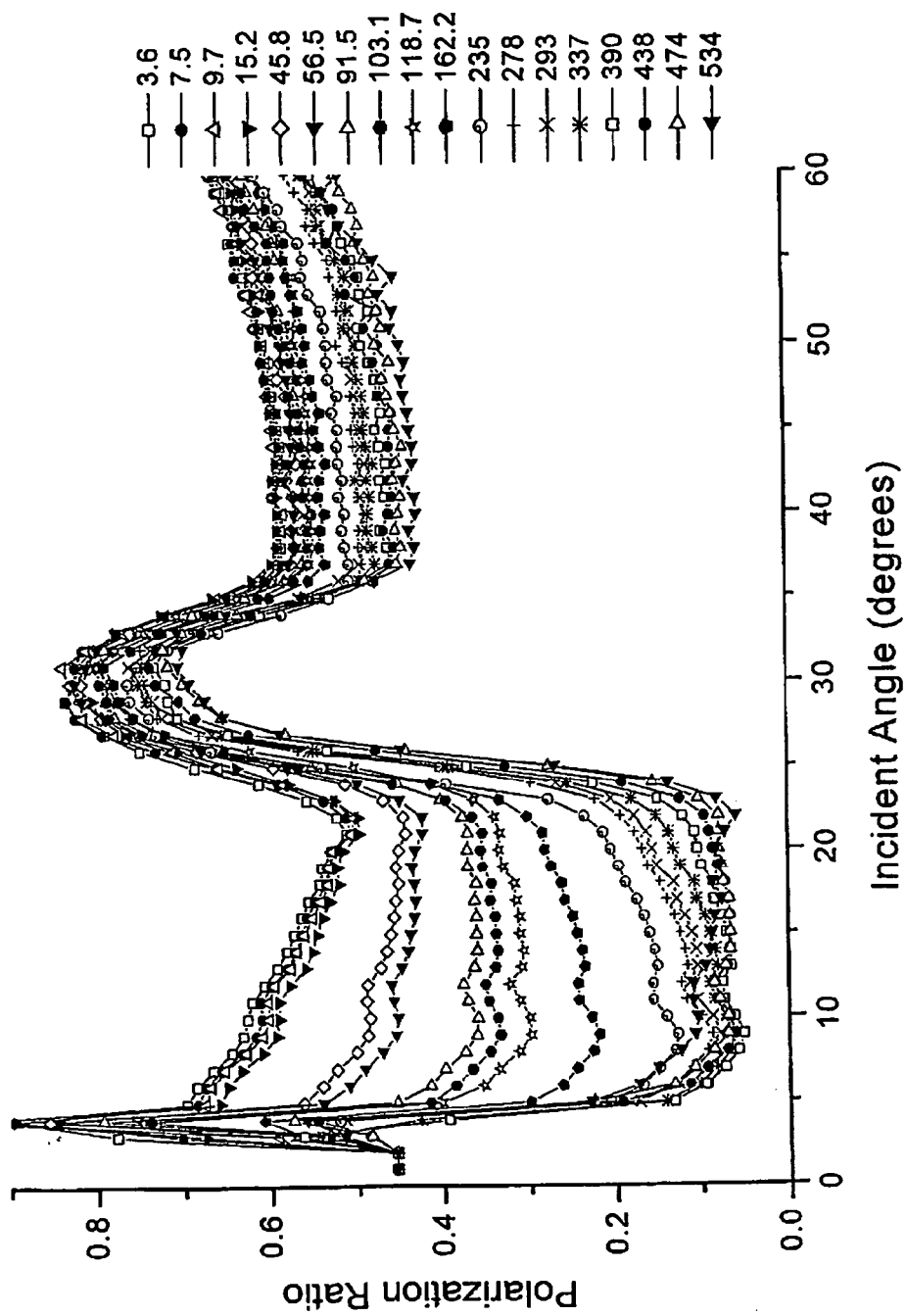
FIG. 10 is a graph illustrating the polarisation ration vs. incident angle for a MM fibre coated with NEON®.

FIG. 10 reports the polarisation ratios vs. the incident angle for the MM fibre of example 2 coated with (green-coloured) NEON® (Pirelli). Again, linearity in the responsiveness of the meter is obtained for angles between about 15 and about 20°.

Results shown in FIGS. 8 to 10 indicate that measurable tensions on coated fibres can range from about 3 to about 250 g.

Figure 11:
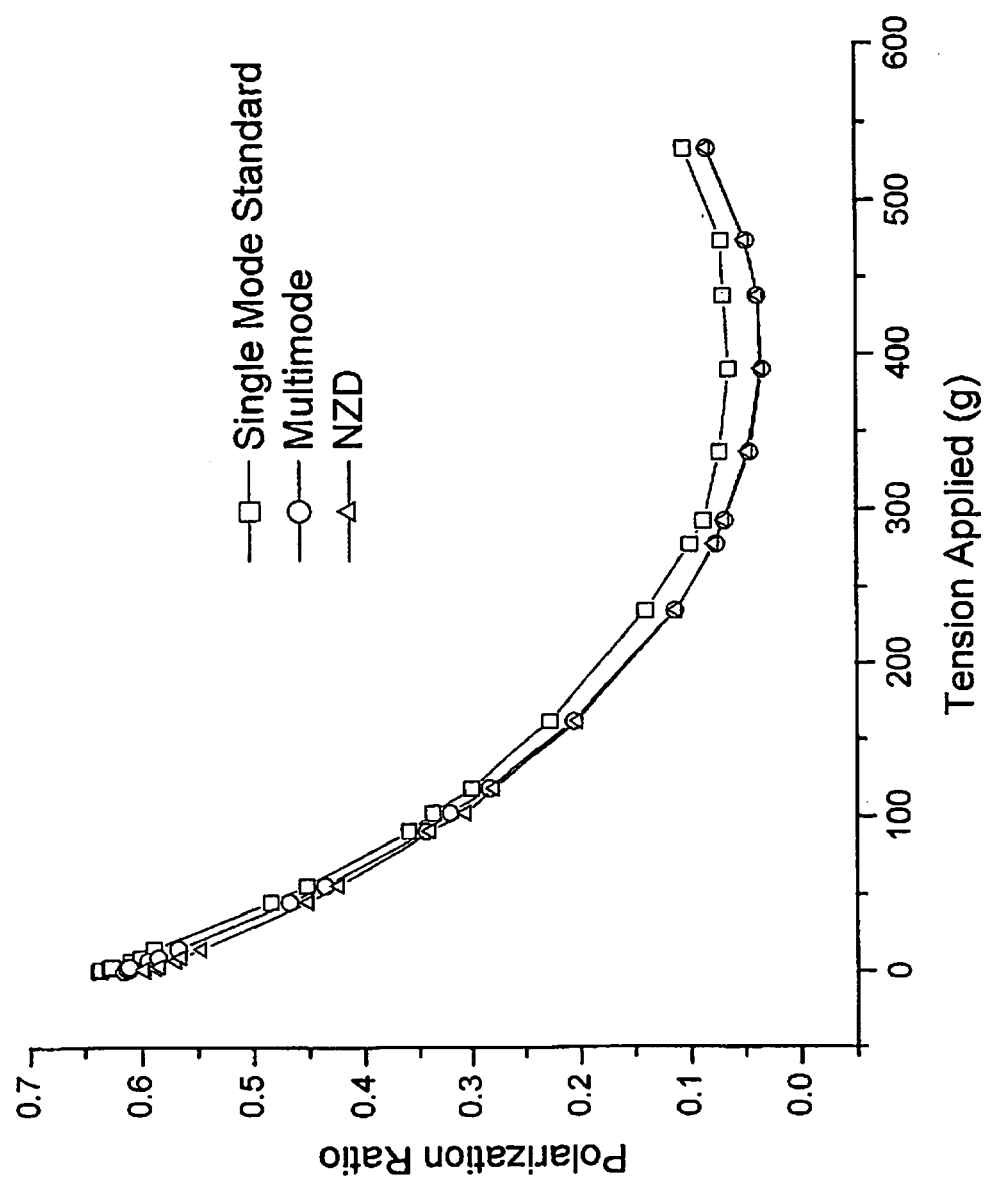
FIG. 11 is a graph illustrating the polarisation ratio as a function of the applied tension with the incident light beam set at θ=10° for the coated SM, MM and NZD fibres described in examples 4 to 6.
Figure 12:
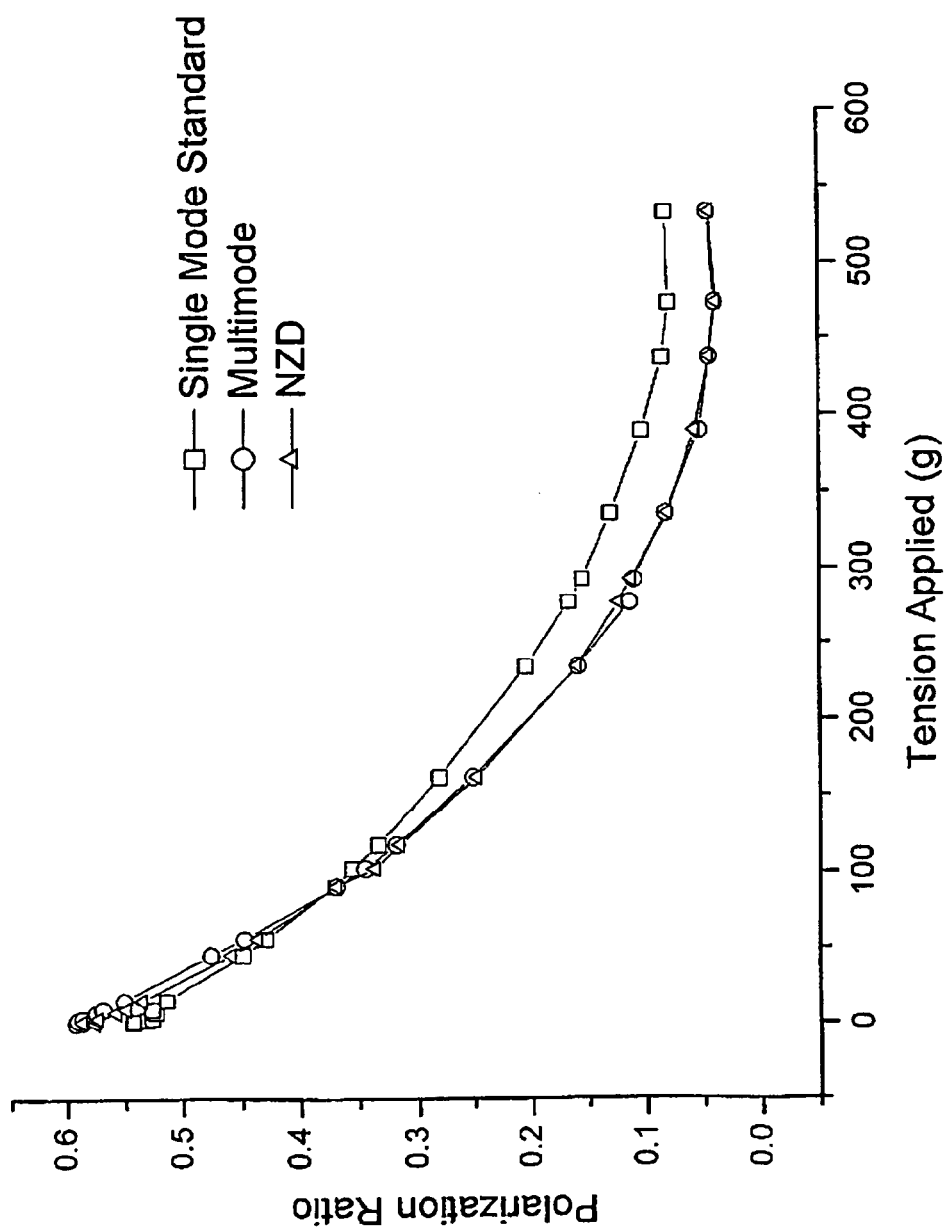
FIG. 12 is a graph illustrating the polarisation ratio vs. applied tension with the incident light beam set at θ=20° for the coated SM, MM and NZD fibres described in examples 4 to 6.

The dependence of the polarisation ratio on the applied tension for the coated fibres is shown in FIG. 11 for an incident angle of 10°. The three different types of fibres (SM, MM and NZD) coated by different coatings exhibit a very similar behaviour with the variation of the applied tension. This indicates that the polarisation ratio has little dependence on the type of fibre and on the type of coating. Analogous results are reported in FIG. 12, where the polarisation ratio for the coated fibres is measured at θ=20°.

It will be clear for those with skill in the art that the tension meter and the relative method described in the examples refer only to an embodiment of the present invention. Obvious modifications and adaptations of the described examples will not depart from the scope of the invention. For example, instead of the two photodetectors PD1 and PD2, a photodetector including two or more separate electrically-independent light sensing areas could be used. Although it was found convenient to use as polarised light emission optical unit a laser diode that emitted a substantially polarised light beam, a light-emitting device (LED) could be used instead as light source. Of course, if the light emitted by a LED or by a laser is unpolarised, a polariser is needed after the light source in order to polarise the light. In other words, the polarised light emission optical unit would comprise a LED or laser diode and a polariser.

The device and method according to the present invention allow measurement of the tension both of bare fibre and of the coated fibre. Several applications can take advantage from the present invention. Coating may change the tension applied to the fibre, e.g., by introducing additional stress on the fibre. The tension due to the stress exerted by the coating on the fibre can be accurately measured. For example, the present invention can be applied to monitor the tension of the fibre before and after coating in order to check whether the fibre is properly coated or not.

Figure 13:
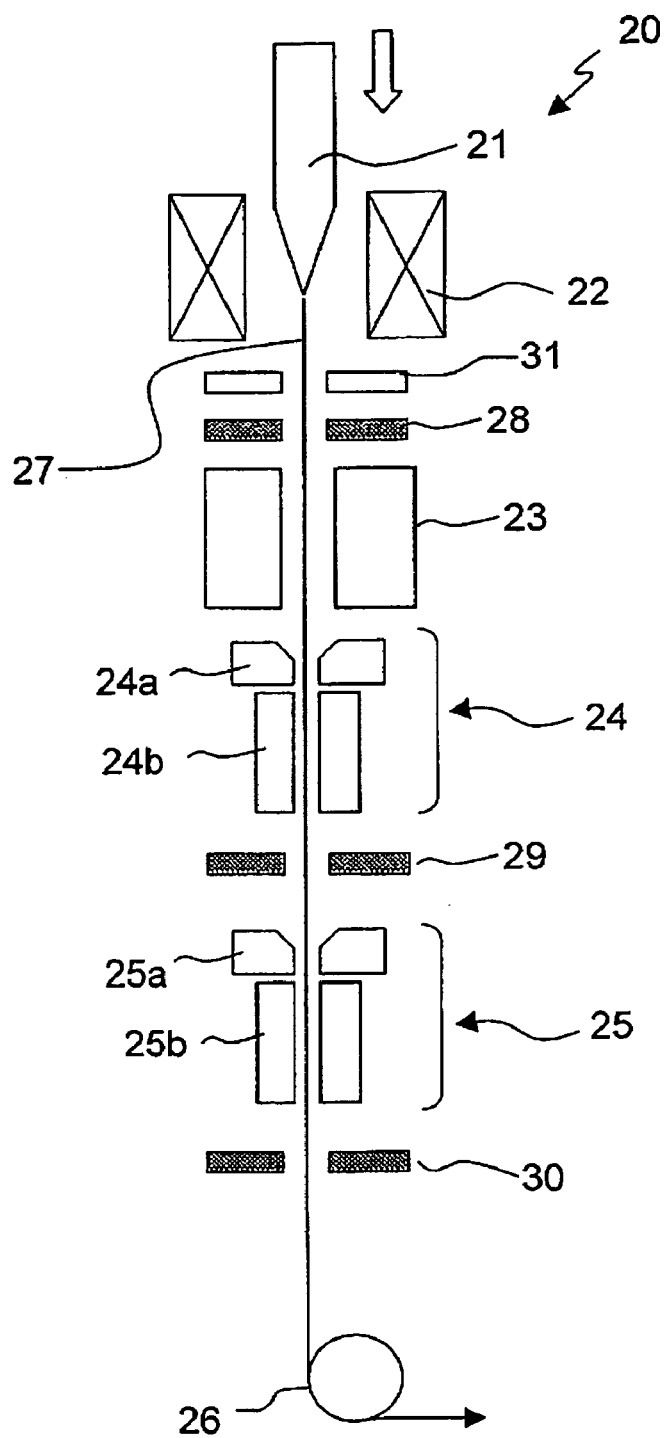
FIG. 13 is a schematic diagram illustrating a fibre drawing system according to an embodiment of the present invention.

FIG. 13 illustrates an optical fibre drawing system (20) according to an embodiment of the present invention. A preform blank 21 is loaded into a furnace 22, for example a graphite furnace, and its tip gets melted and drawn to produce an optical fibre 27. A cooler 23 is placed underneath the furnace for cooling the optical fibre. The cooler can be for example a cylindrical cooler in which a cooling gas flows. A diameter sensor 31 may be provided below the furnace for continues monitoring of the outer fibre diameter. The fibre then is coated with a first coating layer by means of a coating unit 24 that comprises a resevoir 24a containing the coating die, for example an urethane-acrylate material, and a curing unit 24*b*, for example an UV-ray oven for cross-linking the coating die. An optional second coating unit 25 including a resevoir 25*a* and a curing unit 25*b* provides a secondary coating layer on the fibre. A tractor mechanism 26 is located downstream of the coating units. The tractor mechanism pulls the fibre from the heated preform blank and the fibre is wound onto a spool (not shown). A tension meter according to the present invention 28 can be placed beneath the drawing furnace to measure the tension of the bare fibre. Alternatively, the tension meter can be placed below the cooler. Tension meter 30 according to the invention can be placed after the second coating unit 25 in order to monitor the stress introduced into the fibre by the coating. A tension meter 29 can be positioned between the first and the second coating units.

Feedback loops between the furnace temperature and the drawing speed or the tension can be implemented by using the tension meter of the present invention.

It will be clear to those skilled in the art that various modifications and adaptations can be made to the present invention without departing from the scope of this invention, which is defined by the following claims.

What is claimed is:

1. A method of measuring the tension in an optical fibre by measuring the change in the polarisation state of a light beam scattered from the optical fibre, wherein said optical fibre has a longitudinal fibre axis, said method comprising the steps of:

providing a light beam having a polarisation component along the fibre axis and a polarisation component orthogonal to the fibre axis;

directing the light beam onto the optical fibre so that the light beam enters the fibre transversally to the fibre axis and along an incident direction; and detecting the polarisation component along the fibre axis and the polarisation component orthogonal to the fibre axis of a beam scattered from the optical fibre along a detection optical axis, wherein the detection optical axis forms an angle between 10° and 25° to the incident direction.

2. The method of claim 1, wherein the angle is between 15° and 20°.

3. The method of claim 1, wherein the incident light beam is linearly polarised with a polarisation angle of approximately 45° to the fibre axis.

4. The method of claim 3, further comprising the step of linearly polarising the light beam scattered from the optical fibre by means of a quarter-wave plate disposed with respect to the fibre along the detection optical axis.

5. The method of claim 1, further comprising the step of measuring of the intensities of the two orthogonal polarised components of the scattered beam.

6. A tension meter for contactless measuring the tension in an optical fibre having a longitudinal optical axis, said meter comprising:

a polarised light emission optical unit producing a substantially linearly polarised light beam having a polarisation angle of approximately 45° to the fibre axis, said light beam being directed onto the optical fibre along an incident axis;

a quarter-wave plate disposed with respect to the fibre along a detection optical axis so that the light beam scattered from the fibre passes through the quarter-wave plate;

a polarisation separator arranged along the detection optical axis after the quarter-wave plate for spatially separating the scattered light beam into two orthogonal polarised components; and first and second photodetectors, each for receiving one of the two orthogonal polarised components of the scattered light beam, wherein the detection optical axis forms an angle between 10° and 25° to the incident direction.

7. The meter of claim 6, wherein the angle is between 15° and 20°.

8. The meter of claim 6, wherein the polarisation separator comprises a Wollaston prism.

9. The meter of claim 6, wherein a slit is positioned along the detection optical axis between the polarisation separator and the two photodetectors.

10. The meter of claim 6, wherein the polarised light emission optical unit comprises an edge-emitting laser diode.

11. The meter of claim 6, wherein a lens is interposed along the detection optical axis before the quarter-wave plate.

12. The meter of claim 6, further comprising a processing unit for calculating the ratio of the signals generated by the first and the second photodetectors.

13. A method of drawing an optical fibre from a preform blank that is loaded in a furnace and is heated so as to melt its lower end, said fibre having a longitudinal axis and being drawn in a longitudinal direction that defines the fibre axis, wherein the tension in the optical fibre is measured by measuring the change in the polarisation state of a light beam scattered from the optical fibre, comprising the steps of:

providing a light beam having a polarisation component along the fibre axis and a polarisation component orthogonal to the fibre axis;

directing the light beam onto the optical fibre so that the light beam enters the fibre transversally to the fibre axis and along an incident direction; and detecting the polarisation component along the fibre axis and the polarisation component orthogonal to the fibre axis of a beam scattered from the optical fibre along a detection optical axis, wherein the detection optical axis forms an angle between 10° and 25° to the incident direction.

14. The method of claim 13, wherein the angle is between 15° and 20°.

15. The method of claim 13, wherein the incident light beam is linearly polarised with a polarisation angle of approximately 45° to the fibre axis.

16. The method of claim 13, further comprising the step of linearly polarising the light beam scattered from the optical fibre by means of a quarter-wave plate disposed with respect to the fibre along the detection optical axis.

17. The method of claim 13, further comprising the step of measuring the ratio of the intensities of the two orthogonal polarised components of the scattered beam.

* * * * *